UNITED STATES PATENT OFFICE.

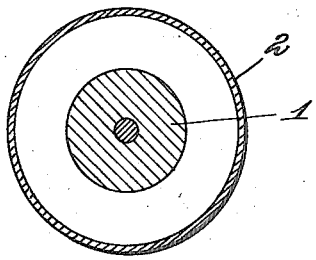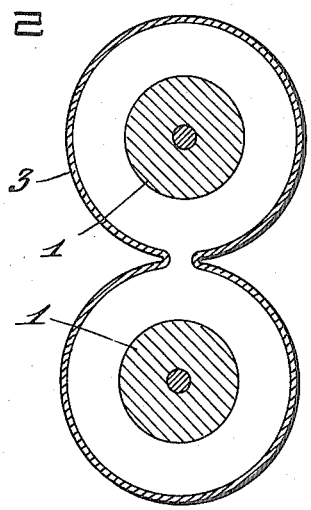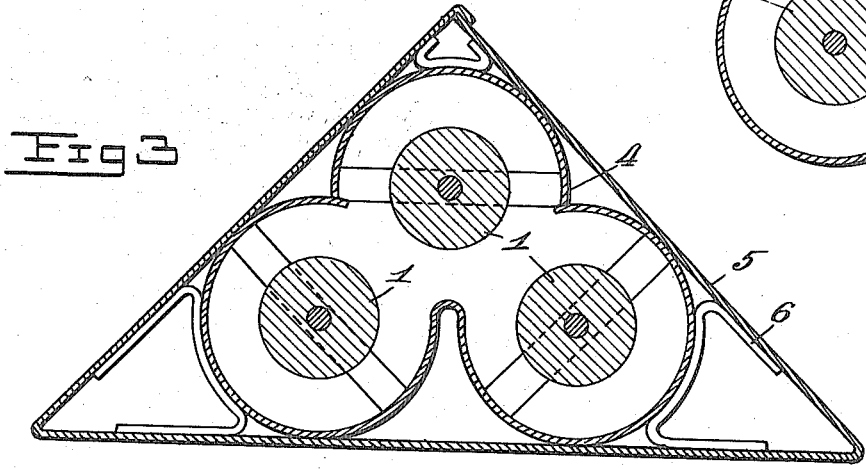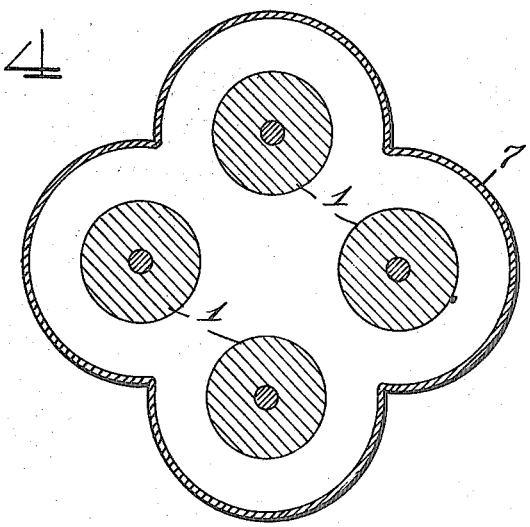

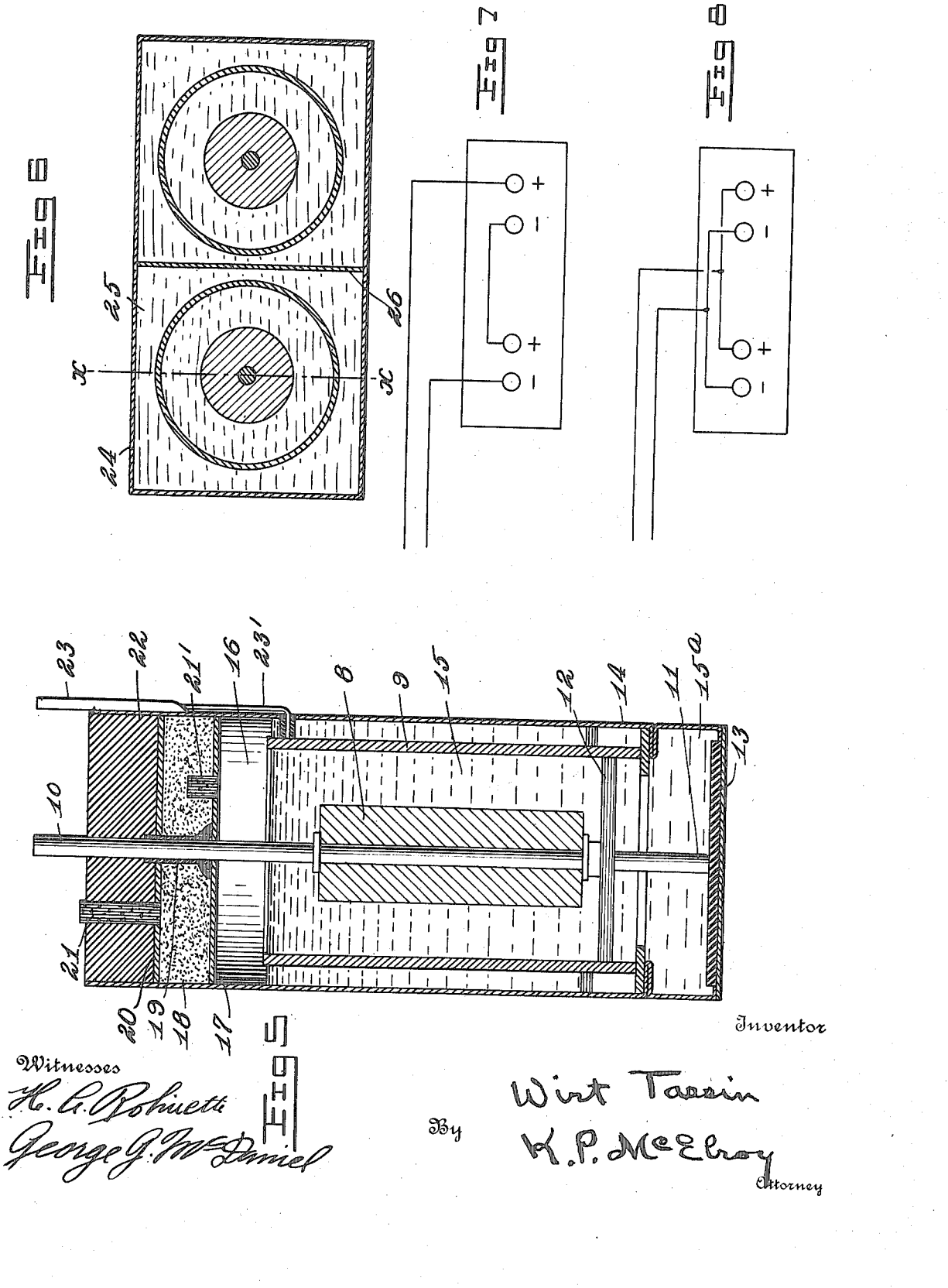

WIRT TASSIN, OF WASHINGTON, DISTRICT OF COLUMBIA; HERMAN E. GASCH, ADMINISTRATOR OF SAID TASSIN, DECEASED, ASSIGNOR TO KINETIC ELECTRIC COMPANY, OF NORFOLK, VIRGINIA, A CORPORATION OF VIRGINIA.

ELECTRIC CELL.

1,196,313.  Specification of Letters Patent.  Patented Aug. 29, 1916.

Application filed January 18, 1915. Serial No. 2,914.

*To all whom it may concern:*

Be it known that I, WIRT TASSIN, a citizen of the United States, residing at Washington, in the District of Columbia, have invented certain new and useful Improvements in Electric Cells, of which the following is a specification.

This invention relates to electric cells; and it comprises an electrolyte chamber provided with a positive element surrounding a negative element and spaced away therefrom, the sizes of said elements and the spacing away bearing certain definite relations which will produce positive electrolyte circulation, these relations in a typical 35 ampere-hour cell being expressed by a cylindrical negative pole of about two and a half inches in length and about seven-eighths inch in diameter with an annular zinc pole spaced away therefrom about one-half inch and extending upwardly and downwardly beyond the ends of the negative pole for about one-half inch in each case; it also comprises such a cell having a negative electrode composed of an intimate and uniform mixture or combination of cuprous and cupric oxids; it also comprises a multiunit cell having a plurality of negative elements and of positive elements within a common container, each of such negative elements having the stated relationship to the corresponding positive element as regards shape, proportions and spacing; and it further comprises a multi-unit cell having a plurality of negative elements and of positive elements in a common container in which the electrolyte bathing the several pairs of elements is in electric or fluid communication with means whereby said positive and negative elements may be coupled up in series or in parallel; all as more fully hereinafter set forth and as claimed.

It is an object of the present invention to produce a cell having a substantially constant rate of current discharge, such rate of current discharge being substantially the same when the cell is fresh and when it is nearly exhausted. It is also an object of this invention to produce such a cell of unusually low weight, small bulk and high capacity for the amount of active material therein contained.

Another object is to provide means whereby a cell of any given voltage or amperage can be produced by a simple assemblage of like units of standard size in a common container.

In any electric cell, whether primary or secondary, it is a desirable matter to have the output of the cell substantially constant from the beginning to the finish in discharging an active cell. Unfortunately, this is seldom the case. In any cell there is a drop in the voltage and in the current, one or both, as discharge continues; and the higher the discharge rate the more pronounced is this drop and the shorter the life of the cell. The reason for this is to be found in two causes—polarization and local changes in the character of the electrolyte. With some types of cell the marked falling off in the voltage under continuous discharge and fixed load conditions is due primarily to the fact that the depolarizing agent cannot take care of the gases formed and these gases in effect set up a counter electromotive force which opposes the flow of the current. Another, and more serious reason with many types of cell is the accumulation of saturated electrolyte next to a pole; in effect the pole becomes blanketed and shielded by such saturated zones. In every case the result is the same, a falling off in the voltage, an inability to maintain the current and a lessening in the rated capacity of the cell.

In the prior art very many ways have been proposed for obviating these conditions since it is desirable, for example, that a cell rated at 100 ampere hours should be able to deliver 100 ampere hours irrespective of the rate of discharge; that is irrespective of whether it is discharged at 1 ampere per hour for 100 time hours or at the rate of 2 amperes per hour for 50 time hours. Some of these ways involve the addition of various depolarizers to the cell in contact with the negative element while others attempt to deal with the circulation difficulties. Means for artificial circulation have often been proposed to prevent localized saturation of the electrolyte. Another expedient is to largely increase the volume of the electrolyte over that required by the chemistry of the cell. External circulating means are however mechanically inefficient or cumbersome and increase the cost of manufacture and operation while increasing the volume of the electrolyte also increases the weight and bulk of the cell and is ordinarily insufficient to obviate local supersaturation. In most or all of the commercial types of cell the weight of electrolyte forms a very large fraction of the total weight of the cell; and in most such cells the electrolyte is present in amounts above that required by the chemical needs of the cell. Most such commercial cells are unsatisfactory for another reason: It is not easily possible to increase their amperage with an efficient employment of electrolyte and of active material; and it is impossible to increase the voltage of any given cell.

In the theory of cell construction if a single unit in a cell consisting of a pair of positive and negative elements and electrolyte has a capacity of $x$, then two such units or two such pairs in a cell should have a capacity of $2x$, and so on. Again, with elements of a given weight and capacity, a simple multiplication of these unit weights should give a directly proportional increase in capacity. In practice, no such results are obtained. In practice, it has been considered impossible to multiply the units in a single container and obtain a proportional increase in capacity or output. Hitherto, troubles due to polarization and lack of circulation have rendered it practically impossible to provide multiunit cells; that is cells having a plurality of like pairs of elements or poles in a common container. Where twice the output of a given primary cell is required it has been found in practice that to double this capacity either two separate cells must be taken or a cell constructed having more than twice the active material of the given cell. That is, an increase in the size of a cell does not give a directly proportional increase in capacity.

I have found that by proper proportioning and arrangement of the positive and negative elements within the electrolyte these circulation difficulties, or the difficulties due to localized accumulations of saturated electrolyte, can be made to disappear, an efficient natural circulation keeping the electrolyte, so to speak, homogenized and uniform. And if I use a certain type of negative electrode consisting of a uniform or intimate mixture or combination of cuprous and cupric oxides (described and claimed in my copending application Serial No. 843,495,) in a caustic soda electrolyte polarization difficulties disappear. By the use of both these expedients I am enabled to provide unusually light weight, constant cells. And with this disappearance of circulation and polarization difficulties I am enabled to make what I may term multiunit cells, these cells containing a plurality of pairs of elements in a common container, thereby enabling me to increase the amperage of the cell to any desired extent by assemblage of standard size elements in the cell. And, unexpectedly, I have found also that I may likewise increase the voltage in exactly the same manner, merely making the connection between the elements in the container in series in lieu of in parallel.

As regards the matter of proportioning, I have found that with practically all electrolytes and positive and negative elements an efficient natural circulation will take place in a cell where one element surrounds, or practically surrounds the other and is spaced away at all points between opposing faces about half an inch, with perhaps a variation of 10 or 20 per cent. more or less. The surrounding electrode should also extend above and below the other electrode to a certain extent. Ordinarily, this extension above and below should be in the neighborhood of one-half inch above and one-half inch below. For example, I have found that I can produce a small cell which will have 35 ampere hour capacity by assembling a rodlike negative element of the described material which is about two and one-half inches long and seven-eighths inch in diameter axially inside an annular zinc element spaced away about one-half an inch. The zinc element is made long enough to extend one-half inch below the lower end of the negative element and about half an inch above its upper end. The zinc annulus may be next the wall of a containing carton. So made this 35 ampere hour cell may weigh as little as 17 ounces in its complete form. With this cell, having the stated dimensions, the circulation of electrolyte, which in this case may be the ordinary sodium hydrate solution, is so perfect as to give a substantially uniform output from first to last; that is, in the described size of cell, which is a 35 ampere hour cell, there is no substantial change in the rate of output whether it be discharged at a rapid rate or at a slow rate. The particular negative element described obviates polarization difficulties while the particular dimensions, or ratio of dimensions, obviate circulation difficulties. And I find that as long as I preserve these ratios I can at pleasure increase the capacity of a cell by increasing the number of negative elements and the area of zinc within it, the increase of capacity being strictly proportionate with the increase in the number of the elements. That is, if I maintain my spacing between all fronting faces of my negative elements and of my zinc I can use two negative elements and a corresponding amount of zinc in a common container and obtain twice the capacity which one such element would give; not, less than twice the capacity, as has been the case with all cells heretofore proposed using a plurality of negative elements. I can use as many negative elements in a common container as may be desirable provided I arrange a corresponding amount of zinc in the container spaced away from the negative element in the manner described.

In the accompanying illustration I have shown, more or less diagrammatically, certain embodiments of the described invention.

In this showing Figure 1 is a central horizontal section of cell elements of a cell having a single negative element; Fig. 2 is a similar view of a cell having two negative elements; Fig. 3 is a similar view of a complete cell having three negative elements and an inclosing positive element contained in a carton; Fig. 4 is a similar view of a cell containing four negative elements; Fig. 5 is a central vertical section of a complete cell containing one or more pairs of elements; and may be taken as a section along line x—x of Fig. 6; Fig. 6 is a central horizontal section of a cell containing two negative elements and two positive elements; Fig. 7 is a diagrammatic top plan view showing wiring connections in series for the cell of Fig. 6; and Fig. 8 is a similar view showing the wiring connections in parallel for the cell of Fig. 6.

In the structure of Fig. 1 reference numeral 1 designates a negative element which may be, and advantageously is, of the described cupro-cupric composition, while 2 designates a surrounding zinc annulus spaced away therefrom about half an inch. In the showing of Fig. 2, 1—1 respectively designates two such negative electrodes while 3 is a zinc positive crimped around them to give the described half inch spacing between opposing faces of the negative and positive elements. In the showing of Fig. 3 the three negative elements are marked as before but the positive element 4 is a sheet of zinc crimped or formed so as to give the described spacing between opposing faces. The whole assemblage is contained in carton or sheet metal container 5. If the container is of metal, wires 6 may be soldered thereto to act as conductors and positioning members. The structure of Fig. 4 is the same as that of Fig. 3 save that the zinc 7 is so shaped as to inclose four negative elements.

Fig. 5 illustrates a complete 35 ampere hour cell containing cupro-cupric element 8 which is seven-eighths inch in diameter and two and one-half inches high. It is placed axially of a zinc annulus 9 spaced away therefrom one-half inch at all points between opposing faces. As shown this zinc element extends downwardly below the lower end of the negative element half an inch and upwardly above its upper end it also extends half an inch. As shown, the negative element is mounted on a conducting rod or wire 10 of iron, brass, etc. This conducting rod or wire may extend through the bottom of the negative element to form a supporting foot or base 11. Bar 12 may be provided for centering. At the bottom may be a disk 13. The whole assemblage of elements may be in container 14 which may be of metal or other material. Where it is of metal the bottom disk (13) is best of fiber or other insulating material to prevent short circuit through the container walls. Within the cell and between the two elements is electrolyte 15 which may be caustic soda solution. It will be noted that the electrolyte extends below the ends of both the negative element and the positive element in a sort of well 15$^a$. Above the electrolyte is splash space 16 closed by a separator 17 or fiber or the like. Above this separator may be a layer 18 of absorbent material of any kind. A mixture of sand and oil in the proportion of about one ounce of heavy oil to a pound of sand is particularly advantageous. Element 19 is an insulator for the described conducting rod (10) or element support. Above this absorbent space is another separator 20 of fiber or the like. A ratan or other tubular vent 21 may be provided for the absorbent space. Another vent 21', advantageously also of ratan, may be provided for the cell chamber proper. As shown, this vent extends a short distance into the absorbent chamber. Chamber or depression 22 may be provided for filling with sealing wax, paraffin, etc. Wire or bar 23 soldered to the conductor 23' affords connection to the zinc.

In the showing of Fig. 6 I have illustrated a cell containing two pairs of elements which are in substance the same as those in Fig. 5, and numbered in the same manner. But, as shown, these two pairs of elements are contained in a box-like container 24 with the electrolyte 25 bathing both pairs of elements in free communication. In order to prevent splashing and the like a porous wall 26 may however be interposed. In Fig. 7 I have shown diagrammatically the method of connecting these two like pairs of elements in series while in Fig. 8 I have shown their connection in parallel. These connections may of course be made by any suitable plugs or other elements.

In the use of the structure of Fig. 6, it may be noted that the two pairs of elements when connected in the manner shown in Fig. 7 will give the assemblage a voltage on closed circuit which is the sum of the voltages of the two pairs. The element however must not be allowed to stand in open circuit when so connected since otherwise local action will take place. The two pairs of elements may at pleasure be used in parallel by the wiring connection shown in Fig. 8. When so connected, they may be used in either open or closed circuit.

I find that these dimensions and ratios are not only highly desirable with regard to the specific cell using a cupro-cupric negative element which I have hereinbefore described but are also applicable to other types of cell. In all other types of cell like concentration difficulties occur and circulation of the electrolyte is also desirable. With the stated dimensions and ratios natural circulation is perfected. I therefore regard my invention as including any cell, whether primary or secondary, having positive and negative elements wherein these ratios are observed.

The cupro-cupric negative element may be made by heating a body of black copper oxid to the melting temperature and casting into molds. At this temperature the black oxid (CuO) loses a portion of its oxygen with formation of red or cuprous oxid ($Cu_2O$); the mass becoming crystalline. The deoxidizing action or dissociation due to heat goes forward until an equilibrium is established. The resulting composition may be viewed as a solid solution of the one oxid in the other or as a true compound of the empirical formula ($Cu_5O_3$). Whatever its molecular constitution, it is for practical purposes a molecular combination or admixture of the two oxids in the ratio of 2:1. In lieu of directly casting the fused material, I may allow it to cool, regrind and mold in the ordinary ways, thereafter heating once more to a high temperature, say, 1840° F. or thereabout. Made in either way, the electrode is substantially uniform and homogeneous; all particles of the electrode have the same composition.

The particular sealing means for the top of the cell shown in Fig. 5, I regard as highly advantageous. The ratan vents 21 and 21' operate to obviate a development of pressure within the cell or the absorbent chamber, while not permitting the passage of liquid. Instead of ratan, other longitudinally porous material like corn pith may be used, but I regard ratan because of its strength and character as the best adapted for the present purposes. The oil-sand mixture contained in the absorbent space 18 when made in the ratio of an ounce of oil to a pound of sand is sufficiently oily to prevent capillary passage of water while it does not contain enough oil to allow the oil to flow away by capillary attraction. Separator or cover disk 17 forms a support for the vent 21' to the splash space and serves to hold the absorbent mass. Separator or cover disk 20 serves to hold the sealing mass 22 proper and also serves as a support for vent 21.

What I claim is:—

1. In an electric cell adapted for self-circulation of electrolyte, a container, a rodlike negative element therein and a positive element substantially surrounding the same, the dimensions of said negative element and said positive element and their spacing apart being so correlated as to produce a positive circulation of electrolyte in said container, these relations in a typical small cell having a negative electrode of about two and a half inches in length being expressed by spacing away the positive element from the negative element about one-half inch between all opposing faces and dimensioning it so as to extend about half an inch above and about half an inch below the upper and lower ends of said negative element.

2. In an electric cell, a container, a rodlike negative element of cupro-cupric oxid therein and a zinc positive element substantially surrounding the same, the dimensions of said negative element and said positive element and their spacing apart being so correlated as to produce a positive circulation of electrolyte in said container, these relations in a typical small cell having a negative electrode of about two and a half inches in length being expressed by spacing away the positive element from the negative element about one-half inch between all opposing faces and dimensioning it so as to extend about half an inch above and about half an inch below the upper and lower ends of said negative element.

3. In an electric cell, a container, a plurality of rodlike negative elements therein and a positive element substantially surrounding each of said rodlike elements, the dimensions of said negative element and said positive element and their spacing apart being so correlated as to produce a positive circulation of electrolyte in said container, these relations in a typical small cell having a negative electrode of about two and a half inches in length being expressed by spacing away the positive element from each opposing face of each negative element about half an inch and so dimensioning said positive element as to extend about half an inch above their upper ends and about half an inch below their lower ends.

4. In an electric cell, a container, a plurality of rodlike negative elements of cupro-cupric material and a zinc positive element substantially surrounding each of said rodlike elements, the dimensions of said negative element and said positive element and their spacing apart being so correlated as to produce a positive circulation of electrolyte in said container, these relations in a typical small cell having a negative electrode of about two and a half inches in length being expressed by spacing away the positive element from each opposing face of each negative element about half an inch and so dimensioning said positive element as to extend about half an inch above their upper ends and about half an inch below their lower ends.

5. In a high amperage cell, a container, a plurality of rodlike negative elements therein and a positive element substantially surrounding each of said negative elements and having a concave face presented to each such negative electrode.

6. In a high amperage cell, a container, a plurality of rodlike negative elements of cupro cupric material and a positive element substantially surrounding each of said negative elements and having a concave face presented to each such negative electrode.

7. In an electric cell, a container, an annular zinc element therein, a rodlike negative element axially placed as regards the annular zinc element, a disklike top for the container located above the annular zinc element, a venting conduit of longitudinally porous vegetable material therein, a second top placed above the first top and above the end of the venting conduit and a layer of absorbent material between the said tops and surrounding said venting conduit.

8. In an electric cell, a container, an annular zinc element therein, a rodlike negative element axially placed as regards the annular zinc element, a disklike top for the container located above the annular zinc element, a venting conduit of longitudinally porous vegetable material therein, a second top placed above the first top and above the end of the venting conduit and a layer of oiled sand between the said tops and surrounding said venting conduit.

9. In an electric cell, a container, an annular zinc element therein, a rodlike negative element axially placed as regards the annular zinc element, a disklike top for the container located above the annular zinc element, a second top above said top, a venting conduit of longitudinally porous vegetable material mounted in said second top and venting the space between the two tops.

10. In an electric cell, a container, a positive and negative element and an electrolyte therein, a pair of spaced tops for said container, a venting conduit for each top, the conduit for the lowermost top extending within the chamber between the two tops but ending short of the uppermost top, a layer of absorbent material in the space between said tops and surrounding the venting conduit of the lowermost top, and a layer of sealing material covering the uppermost top and surrounding the venting conduit extending therefrom.

In testimony whereof, I affix my signature in the presence of two subscribing witnesses.

WIRT TASSIN.

Witnesses:
  S. C. HILL,
  K. P. McELROY.